UNITED STATES PATENT OFFICE.

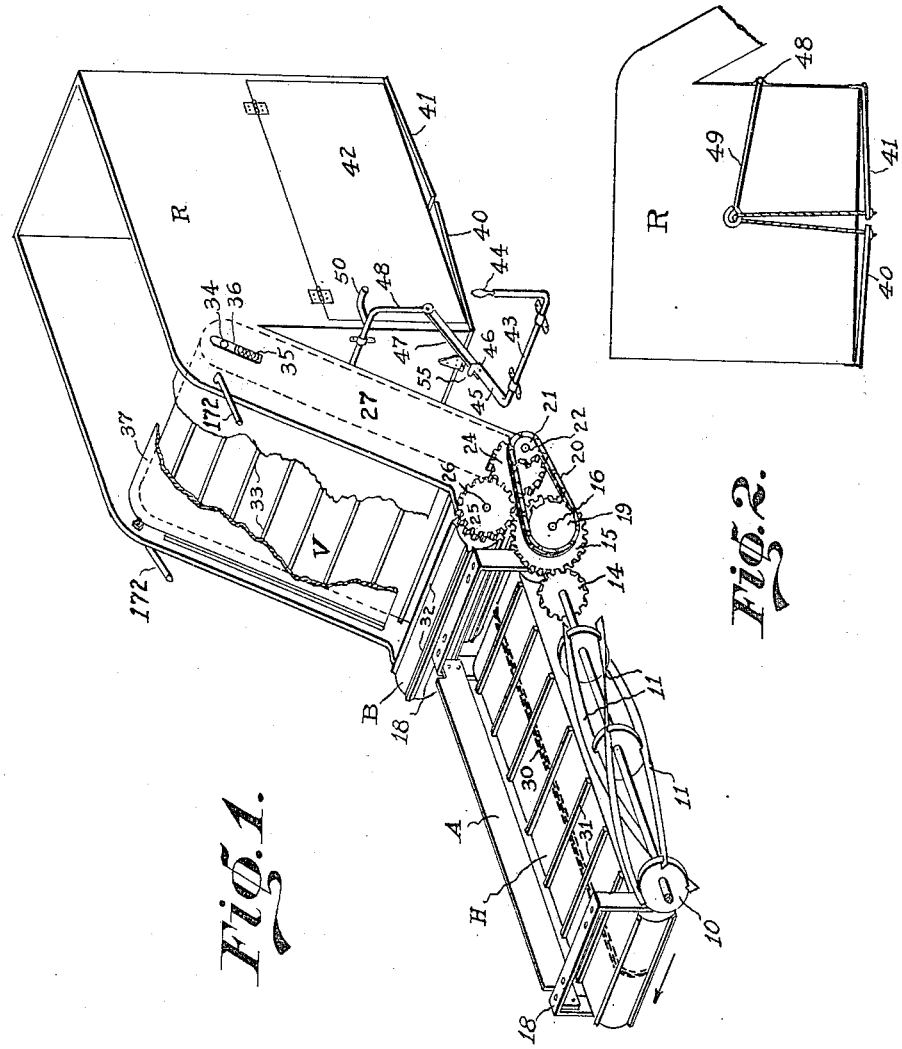

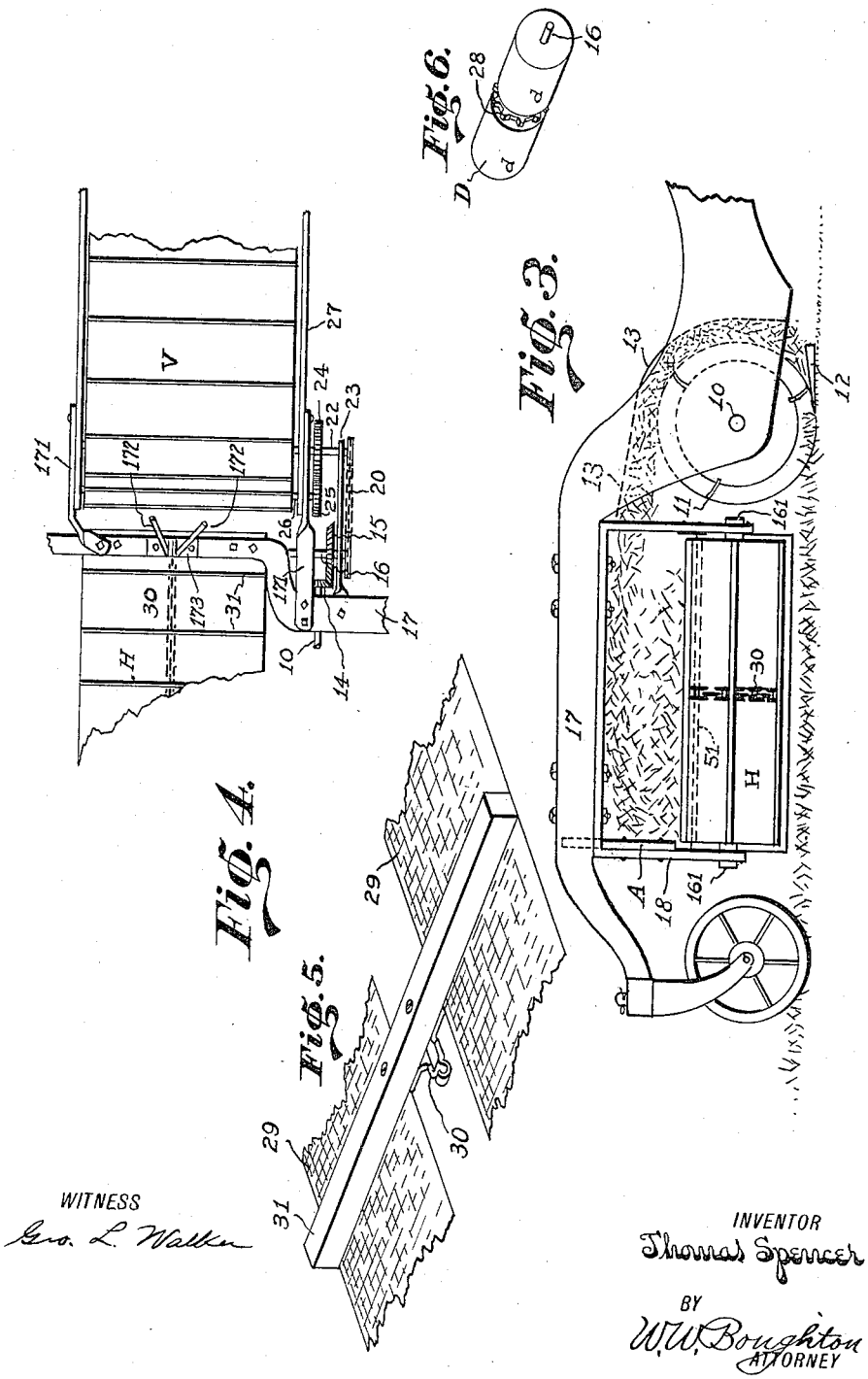

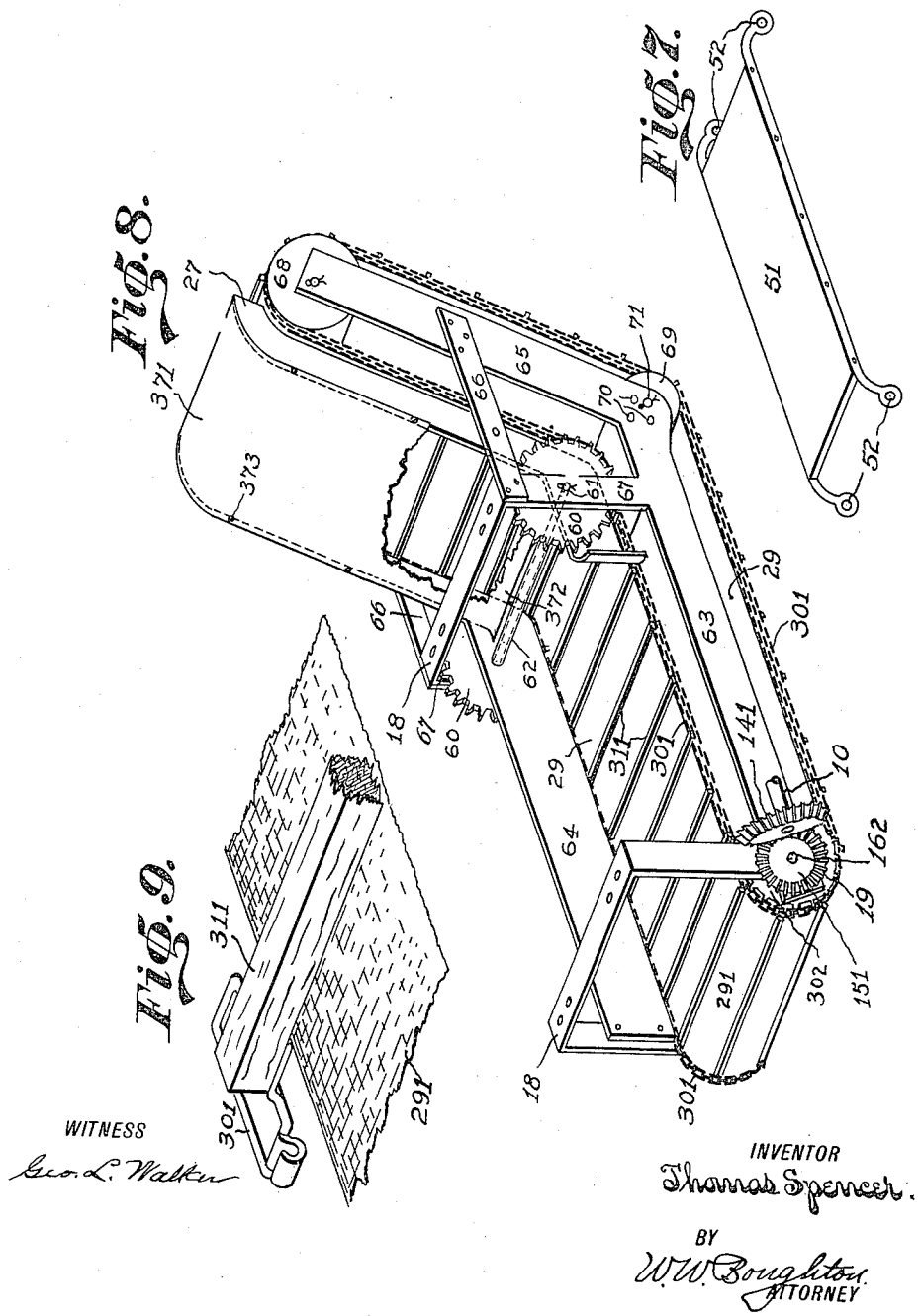

THOMAS SPENCER, OF PUEBLO, COLORADO, ASSIGNOR OF ONE-HALF TO W. C. DARBY, OF PUEBLO, COLORADO.

GRASS CATCHING AND HANDLING DEVICE FOR LAWN-MOWERS.

1,195,288.  Specification of Letters Patent.  Patented Aug. 22, 1916.

Application filed June 28, 1915. Serial No. 36,604.

*To all whom it may concern:*

Be it known that I, THOMAS SPENCER, a citizen of the United States, and a resident of Pueblo, in the county of Pueblo and State of Colorado, have invented a certain new and useful Improvement in Grass Catching and Handling Devices for Lawn-Mowers, of which the following is a full, clear, and exact description.

My invention is a grass catching and handling device for lawn mowers, it being particularly adapted for use in connection with power lawn mowers.

The primary objects of the invention are the provision of a device which will receive the severed grass in front of the cutting knives, thereby leaving the space to the rear of the knives clear for the power plant or other desired mechanism, transport the grass to one side of the machine where it may be received in a receptacle of requisite capacity and which will comprise means for dumping such receptacle when desired.

Another object of my invention is to so construct the device that it may be applied to existing mowers with a minimum of alteration in the mower structure.

Further and more detailed objects and advantages of my invention will later appear in this specification.

In the three sheets of drawings accompanying this application and forming a part hereof Figure 1 is a perspective view of the preferred form of my device as adapted for attaching to a mowing machine (a portion of the guard plate for the vertical conveyer being broken away to show hidden parts) together with the cutter shaft and knives of a mower with which it is adapted to be used, shown for the purpose of illustrating one means of driving my device; Fig. 2 is a front elevation of the grass receptacle; Fig. 3 is a left side elevation, on a slightly enlarged scale, of the front of a mower with the preferred form of my invention installed thereon; Fig. 4 is a top plan view of those portions of the preferred form of my device adjacent the meeting point of the horizontal and vertical conveyers; Fig. 5 is an enlarged perspective view of the horizontal conveyer illustrating a preferred manner of constructing the same; Fig. 6 is a perspective view of one of the horizontal conveyer drums employed with the form of conveyer shown in Fig. 5; Fig. 7 is a perspective view of a supporting plate which may be employed in connection with the horizontal conveyer; Fig. 8 is a perspective view similar to Fig. 1 but illustrating a modified form of my invention; and Fig. 9 is a detached perspective on an enlarged scale illustrating a preferred construction of conveyer for use with this second modification.

Referring to the drawings, 10 indicates the knife carrying shaft which is a part of the mowing machine structure and which may be driven in any usual or desired manner.

11 are the rotating knives which cut the grass by impinging on the stationary knife 12. Above and to the rear of the knives 11 is an apron 13 which retains and directs the grass, the rotation of the knives 11 throwing the grass forward; this apron is shown in Fig. 3 but has been removed in Figs. 1 and 8 to make the views clearer.

Referring first to the modification shown in Figs. 1 to 6 inclusive, the grass receiving and handling mechanism comprises a horizontal conveyer H, a beater B, a vertical conveyer V and a receptacle R. The power for driving the movable of these parts is taken from the shaft 10 which has fixed on the end adjacent the receptacle R a bevel gear 14 which meshes with another bevel gear 15 fixed on the shaft 16 which carries one of the drums on which the horizontal conveyer runs. The shaft 10 has its bearing on the side members 17 of the mower frame, one of which members is shown in each of Figs. 3 and 4 of the drawings. The shaft 16 is journaled in one of a pair of U-shaped brackets 18 which are adapted to be bolted to the under side of extensions of the side members 17 of the mower frame, as indicated in Fig. 3, the brackets 18 being connected and braced by a member A which also serves as a baffle plate to prevent the grass from being projected beyond the conveyer H. On the end of the shaft 16 there is a sprocket wheel 19 on which runs a chain 20 which turns the sprocket wheel 21 on the shaft 22 which carries the drum which drives the vertical conveyer V. The shaft 22 has bearings in the side members 27 of the vertical conveyer frame but to prevent vibration of the shafts 16 and 22 I may add a bracket 23 (see Fig. 4) in which the outer ends of these shafts may be journaled and I prefer to make this bracket of sufficient width to constitute a guard for the various gears and chains behind it to prevent damage thereto and to prevent articles being caught therein. On the shaft 22 there is also a gear 24 which meshes with the gear 25 on the beater shaft 26 which is journaled in the side members 27 of the frame of the conveyer V. The conveyer frame and the receptacle R which it carries are mounted on the adjacent frame member 17 by the brackets 171 and braced by tension members 172 connected to the post 173 which extends upwardly from the side member 17, which post may be guyed in any convenient manner (not shown) to the far side of the frame.

In Figs. 5 and 6 I have illustrated details of the construction of the conveyer H which I prefer to employ though it will be obvious that the details of this and other parts of my device may be departed from without departing from my invention. As shown the conveyer H comprises a pair of drums D (see Fig. 6) one of which is as stated mounted on the shaft 16, the other being journaled on a shaft 161 (see Fig. 3) mounted on the bracket 18 which is at the left as viewed in Fig. 1. These drums comprise cylindrical portions $d$ one on each side of a sprocket wheel 28 which is keyed to the shaft. The traveling part of the conveyer comprises a pair of belt sections 29 adapted to run on the cylindrical portions $d$, and strips 31, preferably of wood, secured to a sprocket chain 30 and to which the belt sections 29 are secured. Such a form of conveyer has the advantage that it will not tend to run off the drums even if unevenly shrunk by dampness to which it is constantly exposed or if foreign materials such as particles of grass should get between it and the drums. It also will not slip and therefore will always positively drive.

The beater B is clearly shown in Fig. 1 and is a cylinder preferably having longitudinal strips 32 on its surface to engage the grass and throw it on the conveyer V; but I have found that points projecting from the beater are also efficient in this action. The length of the cylinder of B is preferably substantially equal to the width of the conveyers H and V and the beater is located as shown adjacent the meeting plane of these conveyers and above the same, being therefore within the angle formed by the upper surfaces of the said conveyers. The vertical conveyer merely consists of a canvas belt with wooden strips 33 similar to the strips 31 shown in Fig. 4 or other similar means for engaging the grass and is driven by a drum on the shaft 21 and runs over another idle drum on the shaft 34. I prefer to employ compression springs 35 in slots 36 in the side members 27 to maintain a uniform tension on the belt of V. A guard 37 inserted in guides or ways in the members 27 occupies a position close to the surface of the conveyer V to hold the grass from falling or blowing off. I have found that in order to assure the vertical conveyer caring for all the grass delivered to it by the horizontal conveyer, it is desirable that it be geared to run at a faster rate of speed and I have illustrated it as so geared.

The grass receptacle R has swinging bottom sections 40, 41, hinged to the sides of R and a swinging rear section 42. The bottom opens to discharge the accumulated grass but I have found that if merely the bottom be opened the grass is liable not to fall in a single pile but to be somewhat strung out. For this reason I have added the swinging section 42 which materially aids in discharging the load into a single pile. Means for opening these sections from the driver's seat are provided as follows:—A lever shaft 43 bent as shown and provided with a handle 44, is mounted in any convenient place on the main frame (as, for instance, on the member 17). The sidewardly turned end 45 of this lever is connected by an elbow joint 46 with a link 47 which is connected at its outer end to the bell crank lever 48. The other end 49 of this bell crank lever supports by means of cords the bottom sections 40, 41, as shown in Fig. 2, and a finger 50 on the lever 48 extends in position to hold the section 42 in place when the handle 44 is in the position shown in Fig. 1 and to clear the section 42 when the handle is swung to the left in Fig. 1. As described, the conveyer H does not require any additional support between the drums D. However, if desired, further support may be given it by a plate 51 such as shown detached in Fig. 7 and indicated in dotted lines in Fig. 3. This plate may be supported on the drum shafts by bent brackets 52 which straddle the drum and bear on the shafts or in any other convenient manner.

Looking at the device from the position from which Fig. 1 was viewed, while cutting the shaft 10 is turning in a counter-clockwise direction and the shaft 16 consequently travels in a clock-wise direction and actuates the conveyer H to travel toward the right on its upper run. Being driven by a sprocket chain the conveyer V also travels in the same direction and the lower side of the beater B also travels in the direction of the conveyers although I prefer to so proportion the gears 24, 25 that the beater will travel the fastest. Momentum of the material on the conveyer H will tend to throw it on conveyer V but the rapidly revolving beater also acting thereon will make this transfer certain and the grass once on V is retained there by the guard 37 and dumped into the receptacle R where it remains until the receptacle is filled or the driver desires to dump it at a particular place. At that time he pulls the handle 44 which breaks the elbow joint 46, lowers 49 and swings 50 out of the path of 42. Thus sections 40, 41 and 42 are allowed to swing open and discharge the contents of the receptacle; when this is complete the handle 44 is swung back to vertical and the elements 45 and 47 somewhat pass alinement (in which position they are held by the lug 55 of the elbow joint) and the receptacle R is held closed until the lever shaft 43 is again moved.

In Figs. 8 and 9 I have illustrated a modification of my device in which but a single endless belt conveyer may be substituted for the two conveyers H and V of the preceding modification. In this form also the power is taken from the knife shaft 10 but the bevel gears 141 and 151 (on the drive shaft 162) are at the opposite end of the shaft 10 and these two gears are the only ones required. For this modification I prefer to employ a conveyer belt comprising a pair of sprocket chains 301, one on each side of the single canvas portion 291 of the belt. The links of the chain 301, specially formed as shown in Fig. 9, carry the wooden strips 311 which strips perform the double function of supporting the canvas and providing the conveyer with a roughened surface to carry the grass through the vertical portion of its travel behind the guard 371. The sprocket chains are driven by sprocket wheels 302 fixed to the shaft 162 and the canvas may be supported on a cylindrical drum between the sprockets 302 in the same manner as the drum portions $d$ shown in Fig. 6 support that belt. At the point of its change of inclination this conveyer passes behind idle sprockets 60 which are mounted on a shaft 61 which is free to rotate within a pipe spacer 62 which forms one element of the conveyer supporting frame 18, 18, 62, 63, 64, the two portions 65, 66, 66, 67 and 67. It will be observed that in this form the frame is a unit which carries all the conveying parts and this is an advantage, particularly in attaching the invention to a machine already constructed. I prefer to give the guard 371 an outwardly turned lip 372 which shall extend substantially to the member 62 and it therefore cannot slide in ways in the side members 27 as did the guard 37 of the other modification but may be attached by screws, bolts or the like 373. After passing behind the directing sprockets 60 the conveyer passes up and around an idle roller or drum 68, down another idle drum 69 and back to the drive drum. I have shown a number of bearing holes 70 in the frame side member for the reception of the shaft 71 of the roller 69 and by placing the shaft 71 in the proper hole the desired tension on the conveyer may be obtained.

Having thus described my invention what I claim and desire to secure by Letters Patent is:—

1. In combination, a mowing machine, means for delivering the severed grass in front of the knives thereof, and conveying means located in front of the knives and operating in a transverse and then substantially vertical direction.

2. In combination, a mowing machine, means for delivering the severed grass in front of the knives thereof, conveying means located in front of the knives and operating in a transverse and then substantially vertical direction, and a receptacle disposed at one side of the mowing machine and into which said vertically operating portion of said conveying means is adapted to discharge.

3. In combination, a mower comprising a rotating knife, an apron inclosing said knife through a part of the circle of its rotation and so disposed as to direct the severed grass in a forward direction, conveying means operating in a transverse and then substantially vertical direction, and a receptacle carried by the mowing machine at one side thereof, into which receptacle said vertically operating portion of said conveying means is adapted to discharge.

4. In combination, a mower comprising a rotating knife, an apron partially surrounding said knife and disposed to the rear and above the knife, said apron directing the severed grass in a forward direction, conveying means operating in a transverse and then substantially vertical direction, and a receptacle carried by the mowing machine at one side thereof into which receptacle said vertically operating portion of said conveying means is adapted to discharge.

5. In combination, a mower comprising a rotating knife, an apron partially surrounding said knife and disposed to the rear and above the knife, and conveying means located in front of the knife and operating in a transverse and then substantially vertical direction.

6. In combination, a mower comprising a rotating knife, an apron inclosing said knife through a part of the circle of its rotation and so disposed as to direct the severed grass in a forward direction, a conveyer traveling in a direction transverse to the direction of cut, a conveyer at one end of said first mentioned conveyer for elevating the material delivered to it by said first mentioned conveyer, and a receptacle into which said last mentioned conveyer discharges.

7. In combination, a mower comprising a rotating knife, an apron inclosing said knife through a part of the circle of its rotation and so disposed as to direct the severed grass in a forward direction, a horizontal conveyer in front of said knife and traveling in a direction transverse to the direction of cut, a substantially vertical conveyer at one end of said horizontal conveyer, means for driving said vertical conveyer at a higher speed than said horizontal conveyer, and a receptacle into which said substantially vertical conveyer discharges.

8. In combination, a mower, a horizontal conveyer receiving the grass severed thereby, a vertical conveyer at one end of said horizontal conveyer, a beater of length substantially equal to the width of said conveyers, and located adjacent the meeting plane thereof, and a receptacle into which said vertical conveyer discharges.

9. In combination, a mower a horizontal conveyer receiving the grass severed thereby, a vertical conveyer at one end of said horizontal conveyer, a rotating beater located above and parallel to the meeting plane of said conveyers, and a receptacle into which said vertical conveyer discharges.

In testimony whereof I have hereunto affixed my signature.

THOMAS SPENCER.

Copies of this patent may be obtained for five cents each, by addressing the "Commissioner of Patents, Washington, D. C."